United States Patent [19]

Pollmeier

[11] Patent Number: 5,278,453
[45] Date of Patent: Jan. 11, 1994

[54] CONSTANT-VOLTAGE SUPPLY SYSTEM WITH SEVERAL CONSTANT-VOLTAGE SOURCES

[75] Inventor: Werner Pollmeier, Verl, Fed. Rep. of Germany

[73] Assignee: Siemens Nixdorf Informationssysteme, Paderborn, Fed. Rep. of Germany

[21] Appl. No.: 635,106

[22] PCT Filed: May 18, 1989

[86] PCT No.: PCT/EP89/00547

§ 371 Date: Jan. 10, 1991

§ 102(e) Date: Jan. 10, 1991

[30] Foreign Application Priority Data

May 18, 1988 [DE] Fed. Rep. of Germany ....... 3816944

[51] Int. Cl.$^5$ .......................... H02J 9/06; H02J 3/02; H02H 3/093
[52] U.S. Cl. ........................ 307/44; 307/66; 307/87
[58] Field of Search ........................ 307/64, 66, 85–; 365/228, 229

[56] References Cited

U.S. PATENT DOCUMENTS

| | | | |
|---|---|---|---|
| 3,932,764 | 1/1976 | Corey | 307/85 |
| 4,122,359 | 10/1978 | Breikss | 307/64 |
| 4,297,590 | 10/1981 | Vail | 307/43 |
| 4,323,788 | 4/1982 | Smith | 307/66 |
| 4,492,876 | 1/1985 | Colbert et al. | 307/66 |
| 4,517,470 | 5/1985 | Cheffer | 307/64 |
| 4,617,473 | 10/1986 | Bingham | 307/66 |
| 4,745,299 | 5/1988 | Eng et al. | 307/66 |
| 4,812,672 | 3/1989 | Cowan et al. | 307/64 |

Primary Examiner—Howard L. Williams
Assistant Examiner—Richard T. Elms
Attorney, Agent, or Firm—Varnum, Riddering, Schmidt & Howlett

[57] ABSTRACT

A voltage supply system with a plurality of voltage outputs is supplied by at least two constant-voltage sources. One voltage output can be supplied alternatively by one or the other voltage source. The alternate supply of voltage output is affected by means of control signals which control a switching arrangement. The control signals are extended to provide a period of overlap such that one voltage supply is connected to the output before another voltage supply is disconnected. As a result, a power loss due to the switching operation is reduced, and substantially compatible voltage levels are produced.

13 Claims, 2 Drawing Sheets

CONSTANT-VOLTAGE SUPPLY SYSTEM WITH SEVERAL CONSTANT-VOLTAGE SOURCES

BACKGROUND OF THE INVENTION

1. Field of the Invention

The invention pertains to a constant-voltage supply system having at least two constant-voltage sources, and more particularly, to such a system in which output voltage is supplied alternatively from one or another constant-voltage source.

2. Prior Art

A constant-voltage supply system in which output voltage is supplied alternatively from one or another constant-voltage source via a switched connection, is known from U.S. Pat. No. 4,492,875. In the event of failure of one voltage source, the system will automatically supply the voltage output from another source, and in this manner assures an uninterrupted supply of voltage. Such a system may be used to supply voltage to expensive high quality electronic systems such as computer systems or security equipment.

In the prior art, the state of the switched connection is controlled by control signals which are generated as a function of the operating state of the particular voltage source. For example, if the voltage of a first voltage source starts to drop below a given value, a control signal is generated which causes one switch to cut off the feeding of the voltage output from that voltage source. Furthermore, a second control signal is generated which drives another switch into the conducting state to establish a conducting path from a second voltage source to the voltage output. However, the first switch is completely turned off before the other switch is driven to the conducting state. In order to guarantee an uninterrupted voltage supply to the systems connected to the alternatively fed voltage output, a capacitor is provided which delivers the energy required to feed the voltage output during the switching interval. The size of the capacitor is determined by the maximum load connected to the voltage output, and can assume very high values. Such capacitors may be physically large and add to the expense and space requirements of the total system.

The switching operation does not occur abruptly, but over an extended switching time, since too steep a voltage rise at the voltage source can result in a current surge which overloads the voltage source. As a result of the extended switching time, a soft switching on or switching off of the voltage sources takes place. Switching time is to be understood as the transition time from the cutoff to the conducting state, and vice versa, of the switch.

It is the object of the invention to provide a voltage supply system which generates a largely uniform voltage level upon switch-over, and at the same time is independent of load.

SUMMARY OF THE INVENTION

These and other problems and disadvantages of the prior art are overcome in an alternatively fed voltage supply system by controlling the switches which connect the voltage sources to the output to be jointly conducting during a specific overlap time period.

Advantageously, in accordance with this invention a capacitor with its previously explained disadvantages becomes superfluous, while the voltage output is continuously fed during switching operation, even if the connected load varies.

Apart from the control of the switch arrangements via control signals which are formed as a function of the operating state of the particular voltage source, it is also possible to generate the latter externally, e.g. in a higher-order control center. In this way, the voltage sources can be effectively controlled, and the voltages at the voltage outputs can be switched on or off.

In one embodiment of the invention, at least one of the switches for connecting the voltage sources to the voltage output is included in an output control device for providing a regulated output voltage. Advantageously, the switch assumes the task of a control transistor and the power transistor normally required for voltage regulation can be dispensed with.

In accordance with one aspect of the invention, the switches are controlled by overlapping control pulses in such a manner that one source is connected to the voltage supply output before another is disconnected. Advantageously, in accordance with this invention, voltage sources are switched on an overlapped basis while providing an uninterrupted voltage supply to the devices connected to the output. In one particular embodiment of the invention, one of the voltage sources is a regulated switched power supply having a predetermined settling time, and the switching time of the switches are controlled to be longer than the setting time of the switched power supply.

BRIEF DESCRIPTION OF THE DRAWING

An illustrative example of the invention is described with reference to the drawing in which.

DETAILED DESCRIPTION

Figure 1:
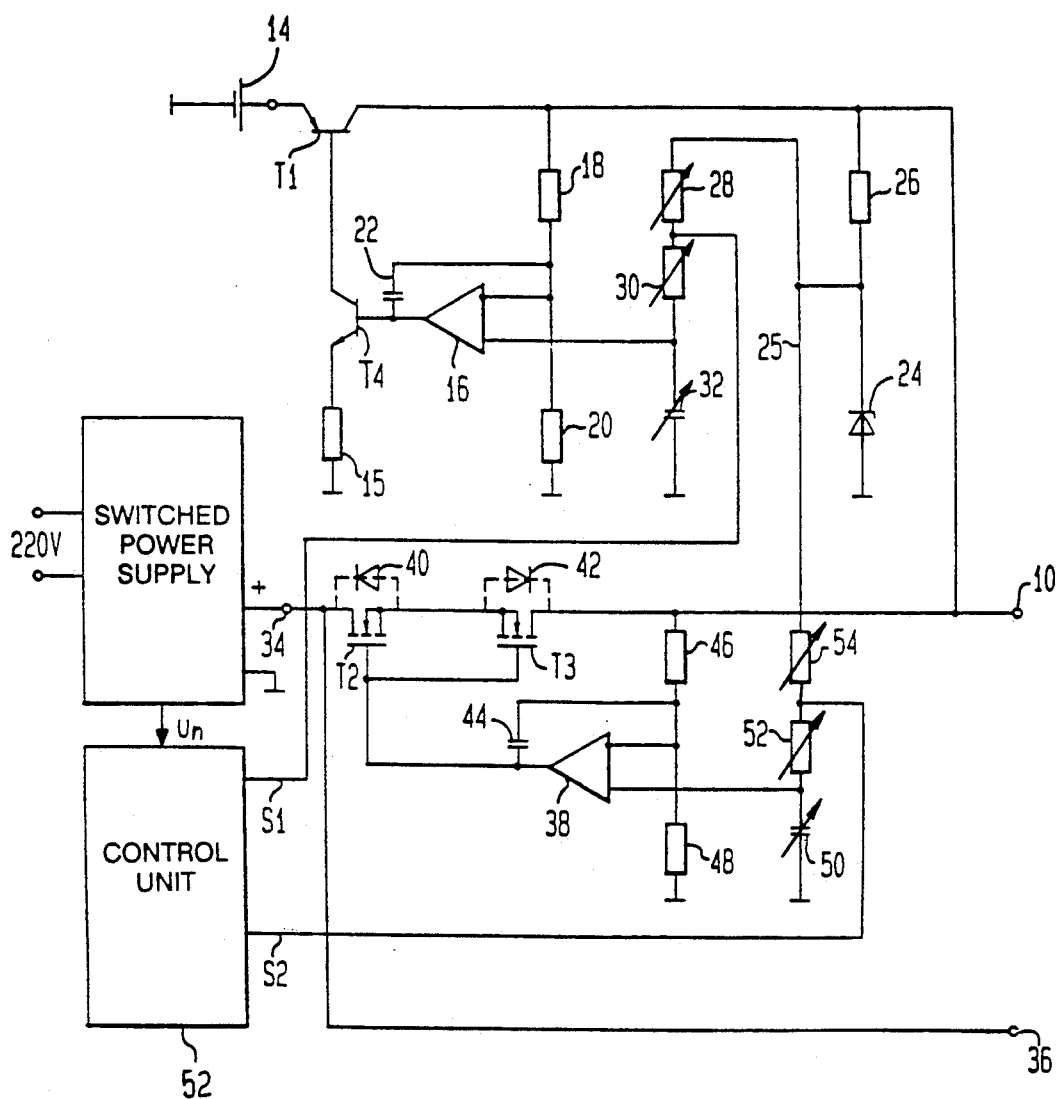
FIG. 1 is a block diagram representation of a voltage supply system incorporating the principles of the invention.

FIG. 1 shows a voltage supply system which voltage output 10 can be fed alternately from a switched power supply 12 connected to a 220-volt alternating current supply or in an emergency from a battery 14. The battery 14 is connected to the emitter of a pnp-transistor T1, the collector of which is connected to voltage output 10. The base of transistor T1 is connected to the collector of an auxiliary transistor T4, which is of npn conductivity type and whose emitter electrode is connected to ground via a resistor 15. Its base electrode is connected to the output of an operational amplifier 16, the inverted input of which is connected to the center of a voltage divider consisting of resistors 18, 20, connected to voltage output 10. The operational amplifier 16 is arranged as an integrator and has a capacitor 22 between its output and inverted input. Between the voltage output 10 and the reference potential, a series resistor 26 and a zener diode 24 are connected in series. At the cathode contact of zener diode 24, a reference voltage 25 is taken off and is led to a voltage divider consisting of a series connection of resistor 28, resistor 30, and capacitor 32. The capacitor 32 is connected to the non-inverted input of the operational amplifier 16. A control signal S1 is applied to the connecting point of resistors 28, 30.

The voltage of the switched power supply 12 is provided on a terminal 34, which is directly connected to another voltage output 36 of the voltage supply system. Between voltage output 10 and the terminal 34 is a switching arrangement consisting of a first MOS-transistor T2 and a second MOS-transistor T3. The gate connections of the transistors T2, T3 are both connected to the output of an operational amplifier 38. The source connections of transistors T2, T3 are directly connected to each other. The drain connection of transistor T2 is put on terminal 34 and the drain connection of transistor T3 at voltage output 10.

The MOS-transistors T2, T3 are self-blocking n channel field-effect transistors and can only block in the drain-source direction. In the opposite direction, these transistors are conductive via their so-called inverse diode. The inverse diodes 40, 42 belonging to the transistors T2, T3, respectively, are shown in phantom between the respective drain source connections in FIG. 1. By interconnecting transistors T2, T3 at their source connection, one of the transistors T2, T3 is operating in an inverse mode, for an example, the transistor T3 as shown in FIG. 1.

The output of the operational amplifier 38, arranged as an integrator, is by way of a capacitor 44 connected to its inverted input. This is connected to the center of the voltage divider consisting of resistors 46, 48 which is fed via the voltage output 10. The non-inverted input of operational amplifier 38 is connected to capacitor 50, which has one contact connected to ground. The capacitor 50 is connected via series resistors 52, 54 with the cathode contact of zener diode 24. At the connecting point of resistors 52, 54, a second control signal S2 is introduced.

Figure 2:
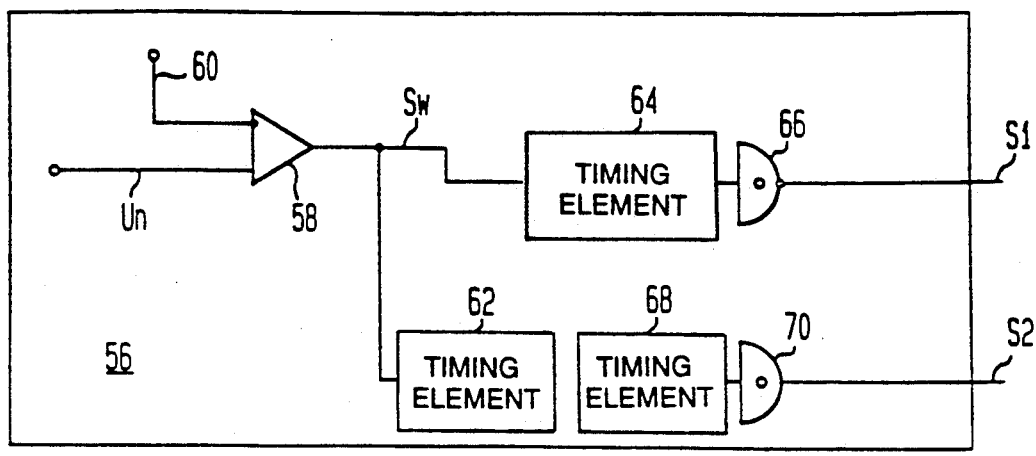
FIG. 2 is a block diagram of a circuit arrangement for the producing of control signals.

The control signals S1, S2 are generated by control 56, which monitors the voltage level of the switched power supply 12, or by control signals of a higher-order control center (not shown). The switching arrangement of such a control 56 is shown in FIG. 2. A threshold switch 58 is supplied with a reference voltage 60 at its inverted input and with a voltage signal Un proportional to the supply voltage of the switched power supply 12 at its non-inverted input. At its output, the threshold switch 58 generates a high-level output signal Sw when the level of the voltage signal Un is higher than the reference voltage 60. Otherwise it generates a low-level output signal Sw. The output of the threshold switch 58 is connected to a timing element 62, which delays the declining slope of the output signal Sw by a time t1 and to a timing element 64, which delays the rising slope of the output signal Sw by a time t3. Connected after this timing element is an inverter 66 with open-collector output which generates a signal S1 with approximately ground potential when a high-level signal is applied to the input of the inverter 66. With a low-level input signal, the output of the inverter 66 enters a high resistive state, i.e., no specific voltage level is given to the control signal S1 via the inverter 66. Connected after timing element 62 is another timing element 68 which delays the rising slope of output Sw by time t2. The timing element 68 controls gate 70, which also has an open-collector output and which generates the control signal S2.

Figure 3:
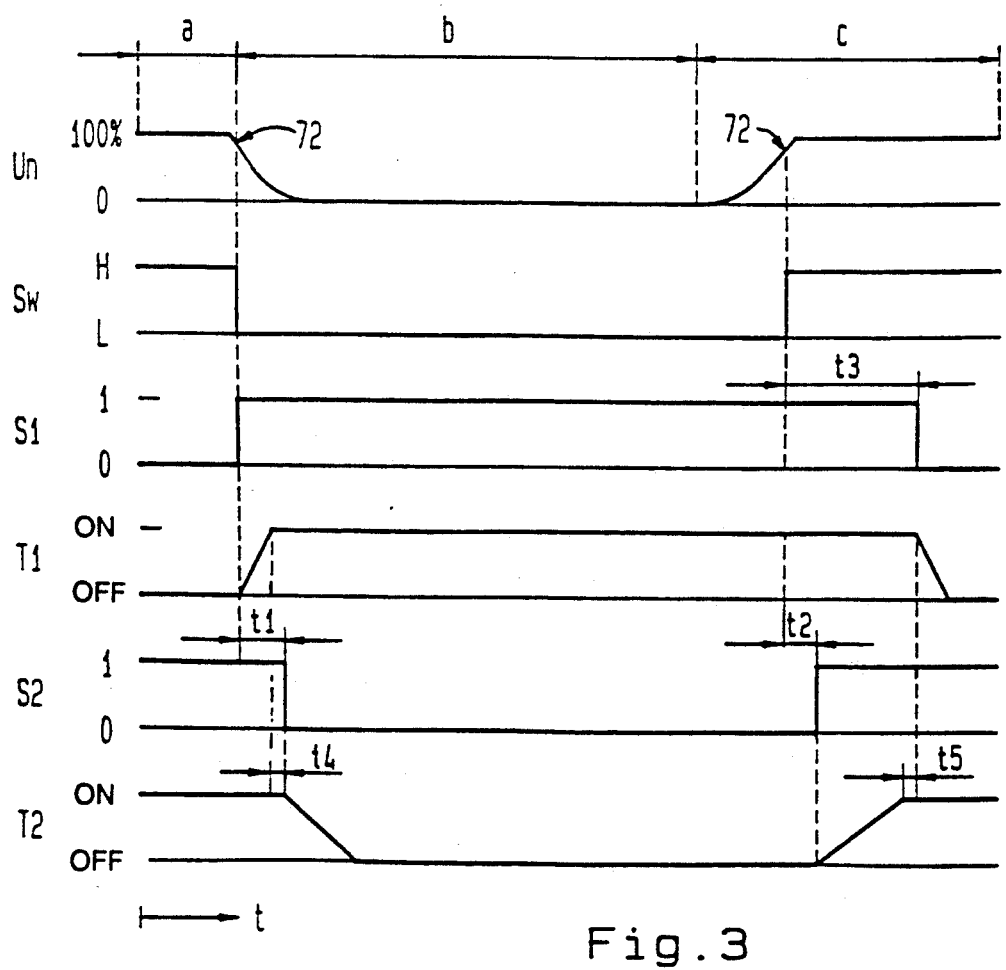
FIG. 3 is a timing diagram showing the progress of control signals and operational states of circuit elements, over time.

FIG. 3 shows the progress of different signals as well as the conditions of transistors T1, T2 over time t under various operating conditions a, b, c, which will be explained further. The voltage signal Un can fluctuate between the nominal value, given as 100%, and the value 0. The output signal Sw of the threshold switch 58 can, as described, assume the condition L (low level) and H (high level). The control signals S1 and S2 also have two conditions which are marked logic 0 and logic 1. In the condition logic 0, the control signals S1, S2 are at ground potential. In condition logic 1, these are in a high resistive condition. The transistors T1, T2 have "blocking" and "conducting" conditions which are marked in FIG. 3 with "off" or "on". The transistors T1, T2 are switched back and forth between these conditions in a given switching time, so that the voltage increase or decrease at the output of transistors T1, T2 develops evenly.

The function of the voltage supply system will now be explained with reference to FIGS. 1, 2, and 3. First it is assumed that switched power supply 12 functions properly and that there is a positive voltage at terminal 34 (operating condition a in FIG. 3). The voltage signal Un is in the normal operating condition greater than the reference voltage 60, and the threshold value switch 58 in FIG. 2 has at its output a high-level output signal Sw. Consequently, a control signal S1 with logic condition 0 is produced at the output of inverter 66, and a control signal S2 with logic condition 1 is produced at output of the gate 70.

Because the control signal S1 is at ground potential, the voltage on the non-inverting input of the operational amplifier 16 in FIG. 1 is also approximately zero. Also, the output voltage of operational amplifier 16 is zero and the transistors T4 and T1 are blocking. The battery 14 is thereby decoupled from voltage output 10.

The high resistive control signal S2 does not put a load on the voltage divider, which consists of resistors 54, 52. The reference voltage 25 of zener diode 24 is applied to the non-inverted input of operational amplifier 38. The operational amplifier 38 together with transistors T2, T3 form a regulating circuit. The operational amplifier 38 operates as a PI-regulator and the transistors T2, T3 operate as final control elements. The actual value is applied to the inverted input, and the nominal value is applied to the non-inverted input of operational amplifier 38. The operational amplifier 38 performs the nominal/actual comparison and regulates the voltage at its output in such a way that the transistors T2, T3 are conductively controlled via their gate electrode and the nominal/actual deviation is minimized. The time response of the regulating circuit is set by the time constant, which results from the resistors 46, 48 and capacitor 44.

For the next operating condition b of FIG. 3, it is assumed that the supply voltage supplying the switched power supply breaks down. The voltage signal Un decreases exponentially and falls below reference voltage 60 at threshold 72. A breakdown of the supply voltage of switched power supply 12 does not mean that its output voltage drops abruptly. On the contrary, the energy stored in the capacitors of the switched power supply is sufficient to supply voltage for a certain time. After the voltage signal Un has fallen below the reference voltage 60, the threshold switch 58 in FIG. 2 switches its output signal Sw to low level and the inverter 66 produces the control signal S1 with logic condition 1 at its output. The declining slope of output signal Sw of threshold switch 58 is delayed by timing element 62 by time t1 and switches the control signal S2 to the logic condition 0 by way of gate 70.

The capacitor 32 in FIG. 1 is charged to the reference voltage 25 by way of the series-connected resistors 28, 30. The operational amplifier 16, operating as a regulator, controls the transistor T4 to be conducting, which supplies the transistor T1 with base current so it will be switched on. The switching time of transistor T1 is determined by the time constant of the operational amplifier 16, which arises out of its connections to resistors 18, 20 as well as capacitor 22, and also by the time constant from resistors 28, 30 and capacitor 32. The voltage from transistor T1 will be applied to the operational amplifier 16 via the voltage divider, consisting of resistors 18, 20, compared with the voltage level of the zener diode 24 and regulated to a constant value.

As already described, the control signal S2, after expiration of time t1, is at ground potential, e.g., the capacitor 50 is discharged with a time constant, which is formed by resistor 52 and capacitor 50. The operational amplifier 38, operating as a regulator, receives a near zero nominal value voltage and effects the MOS-transistors T2, T3 into a blocking condition. Because the MOS-transistors T2, T3 are interconnected at their source electrodes, one of the inverted diodes 40, 42 is switched in the direction of blocking so that a feedback of the switched power supply 12 does not take place.

The described opposite switching operations, e.g., the switching on of transistor T1 or the switching off of transistor T2, T3 are set by the mentioned time constants so that they overlap by time t4, as shown in FIG. 3. The voltage output 10 maintains its voltage level unchanged during the switching operations.

In the following, as shown in FIG. 3 under c, the operating condition when the voltage is returned to the switched power supply 12 will be dealt with. At the return of voltage, the voltage signal Un increases and exceeds the reference voltage 60 at threshold switch 72. The threshold value 58 in FIG. 2 switches its output signal Sw from low level to high level. After a time t3, the control signal S1 is brought into condition logic 0 through the inverter 66, while the control signal S2, after expiration of time t2, is switched over to a high-resistive condition. The time t2 is set in such a way that before expiration of this time the switched power supply 12 has reached it full operating voltage. The voltage signal S2 does not put a load on the voltage divider consisting of the resistors 54, 54 and capacitor 50. Capacitor 50 is charged to voltage 25 of the zener diode 24 via the resistors 52, 54. The operational amplifier 38 brings the transistors T2, T3 to the conducting state in accordance with the increasing charge at capacitor 50, and the switched power supply 12 feeds voltage to voltage output 10.

The control signal S1, which is near ground potential, effects a discharge of capacitor 32 via the resistor 30. Accordingly, the transistor T1, via transistor T4 and the operational amplifier 16, is switched to the cutoff condition, and the battery 14 is decoupled from the voltage output 10. Also, the switching operations for switching on or switching off of the transistors T2, T3, or T1 occur on an overlapping basis, e.g., the time constants are chosen in such a way that an overlapping time t5 results, in which the transistors T1, T2, T3 are conducting, as shown in FIG. 3.

The switching times of the transistors T1, T2, T3 are adjusted in such a way that they are longer than the settling time of the switched power supply 12. Thus, it is assured that the switched power supply 12 is not overloaded by dynamic regulating operations during the settling of faults. The voltage of the zener diode 24, which serves as the nominal value voltage for regulating the output voltage at voltage output 10, is taken off at the voltage output 10 via the series resistor 26. A drop in the voltage at voltage output 10 for a short period of time allows the voltage of zener diode 24 to decrease, whereby the transistors T1, T2, T3 are regulated to a lower output voltage. The voltage supply system thereby functions dependably with short duration overload. The same holds true for the operational amplifier 16, 38, the operating voltage of which (not shown) is also taken off at the voltage output 10. With a drop of the voltage at the voltage output 10, the output voltages of the operational amplifiers also drop, by which the transistors T2, T3 are regulated to a safe shutoff condition.

The design example shown in FIG. 1 can be supplemented by various switching arrangements. It is possible to add more transistors, functioning as a switching arrangement, between the voltage output 36 and terminal 34. Via control signals, which regulate these transistors, the voltage output 36 can be connected to or disconnected from the output voltage of the switched power supply 12. In addition, it is also possible to switch several transistors in parallel to divide the current to so further reduce the power loss at a transistor as well as the voltage drop.

It is possible as well not to connect the contact of resistor 54 to the zener diode 24, but instead to connect it to terminal 34 via an additional voltage divider (not shown). The voltage of the capacitor 50, serving as nominal value, is then proportional to the voltage of switched power supply 12. When this voltage drops, the transistors T2, T3 will be shut off via the operational amplifier 38, which functions as a regulator, and when voltage returns, these will be switched to conducting only after the switched power supply 12 reaches the full operating voltage. By this provision, the dependability of the voltage supply system is further enhanced.

What is claimed is:

1. A constant-voltage supply system having at least one voltage output which is supplied from at least two constant-voltage sources via a switch arrangement responsive to control signals to selectively disconnect a first of the voltage sources from the voltage output and connect a second of the voltage sources to the voltage output, characterized in that the system comprises timing elements for generating the control signals and the timing elements are selected such that the second of the voltage sources is connected to the voltage output before the first of the voltage source is disconnected from the voltage output, whereby the switch arrangement is controlled to cause the voltage output to be supplied from both of the at least two sources during a specific overlap time period.

2. The system in accordance with claim 1, characterized in that the switch arrangement comprises a plurality of switch elements and the system comprises an output control device and that at least one of the switch elements is included in the output control device.

3. The system in accordance with claim 2, characterized in that the operating voltage of the control device is taken from the voltage output.

4. The system in accordance with claim 1, characterized in that the switch arrangement comprises at least one pair of interconnected MOS field-effect transistors having source and drain leads connected in series, whereby one of the transistors is operated in an inverse mode.

5. The system in accordance with claim 12 wherein the first of the voltage source is a regulated switched power supply having a predefined settling time required for the regulated power supply to stabilize in response to changes in conditions external to the regulated power supply, characterized in that the switch arrangement has switch-over times for switching from the first to the second of the voltage sources that are longer than the predefined settling time of the switched power supply.

6. The system in accordance with claim 2, characterized in that the control device has a nominal input value derived from at least one of the voltage sources.

7. The system in accordance with claim 1, characterized in that the system comprises timing elements and switching times of the switch arrangement may be varied by adjusting the timing elements.

8. The system in accordance with claim 7, characterized in that the timing elements include resistive elements and have associated time constants which are adjustable by adjusting the resistive elements.

9. The system in accordance with claim 1, characterized in that switch arrangement comprises a first switch for selectively disconnecting the first of the sources from the voltage output and a second switch for selectively connecting the second of the sources to the voltage output and control circuitry responsive to a change in output voltage level of the first of the sources to control the second switch to connect the second of the sources to the voltage output and control the first switch to disconnect the first of the sources from the voltage output a predetermined period of time after controlling the second switch to connect the second of the sources to the voltage output.

10. A constant-voltage supply system having a voltage output terminal and comprising:
   at least first and second constant-voltage sources for supplying output voltage to the output terminal;
   a switch arrangement responsive to connect and disconnect control signals to selectively connect one of the constant-voltage sources to and disconnect another of the constant-voltage sources from the voltage output terminal;
   a control unit responsive to an input signal indicative of a change in output voltage of the first source to a level below a predetermined threshold level to generate a connect control signal controlling the switch arrangement to connect the second source to the output terminal and to subsequently generate a disconnect control signal controlling the switch arrangement to disconnect the first source from the output terminal, the connect and disconnect signals being generated on an overlapped basis, whereby the switch arrangement is controlled to connect the second of the constant-voltage sources to the output terminal before disconnecting the first of the constant-voltage sources from the output terminal.

11. The system in accordance with claim 10 and further comprising an output regulating circuit and wherein the switch arrangement comprises a plurality of switch elements and the output regulating circuit includes at least one of the switch elements.

12. The system in accordance with claim 10, and further comprising adjustable timing elements and wherein a period of overlap may be changed by adjustment of the adjustable timing elements.

13. The constant-voltage supply system in accordance with claim 10 wherein the control unit is further responsive to input signals indicative of a change in output voltage of the first source to a level above the predetermined threshold level to generate a connect control signal controlling the switch arrangement to connect the first source to the output terminal and to subsequently generate a disconnect control signal controlling the switch arrangement to disconnect the second source from the output terminal.

* * * * *

UNITED STATES PATENT AND TRADEMARK OFFICE
CERTIFICATE OF CORRECTION

PATENT NO. : 5,278,453

DATED : Jan. 11, 1994

INVENTOR(S) : Pollmeier

It is certified that error appears in the above-identified patent and that said Letters Patent is hereby corrected as shown below:

Claim 1, column 6, line 50, "voltage source" should read --voltage sources--.

Claim 5, column 7, line 1, "claim 12" should read --claim 1--.

Signed and Sealed this

Twenty-sixth Day of July, 1994

*Attest:*

BRUCE LEHMAN

*Attesting Officer*   *Commissioner of Patents and Trademarks*